July 12, 1960     J. FREEDSON     2,944,649
PRINTING DEVICE WORK HOLDER
Filed Aug. 16, 1956     3 Sheets-Sheet 1
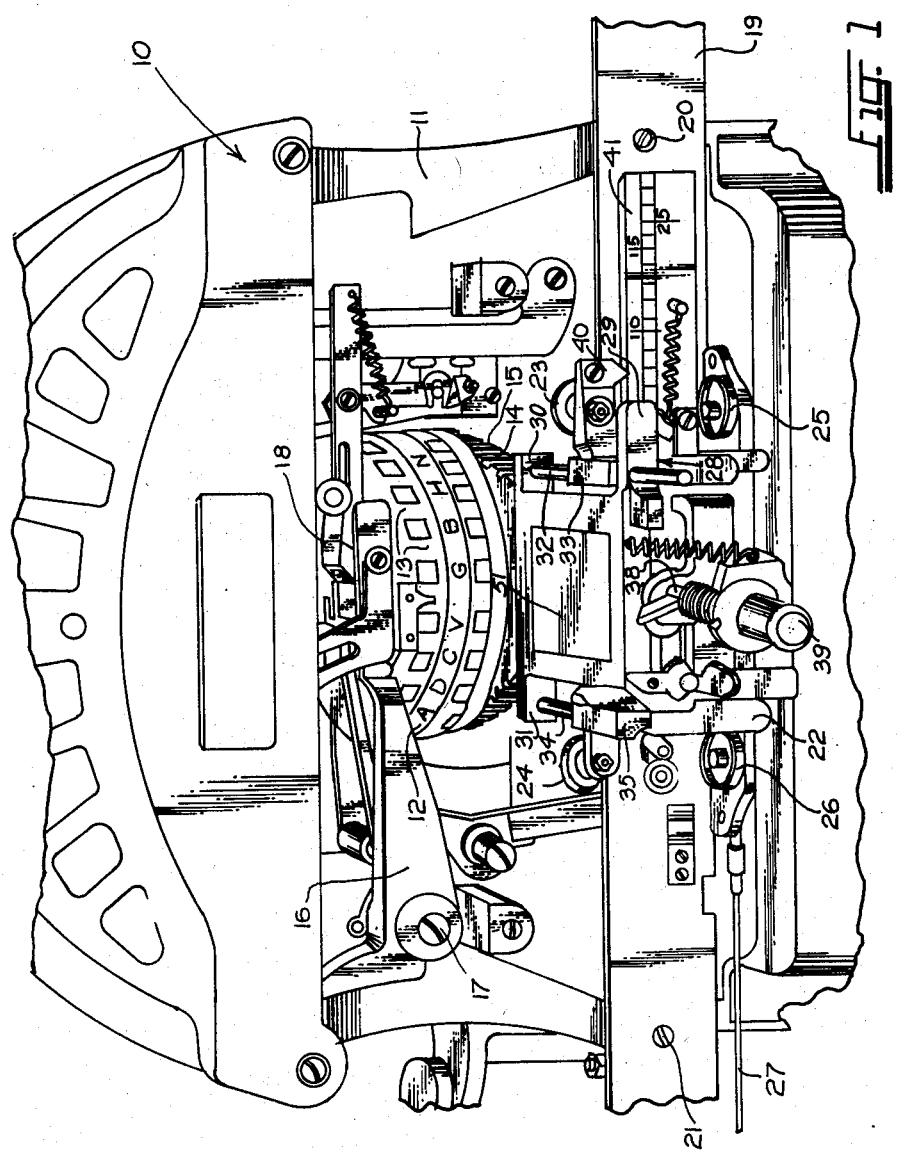
INVENTOR.
JOSEPH FREEDSON
BY
*Wallace and Cannon*
Atty's.

July 12, 1960   J. FREEDSON   2,944,649
PRINTING DEVICE WORK HOLDER
Filed Aug. 16, 1956   3 Sheets-Sheet 2
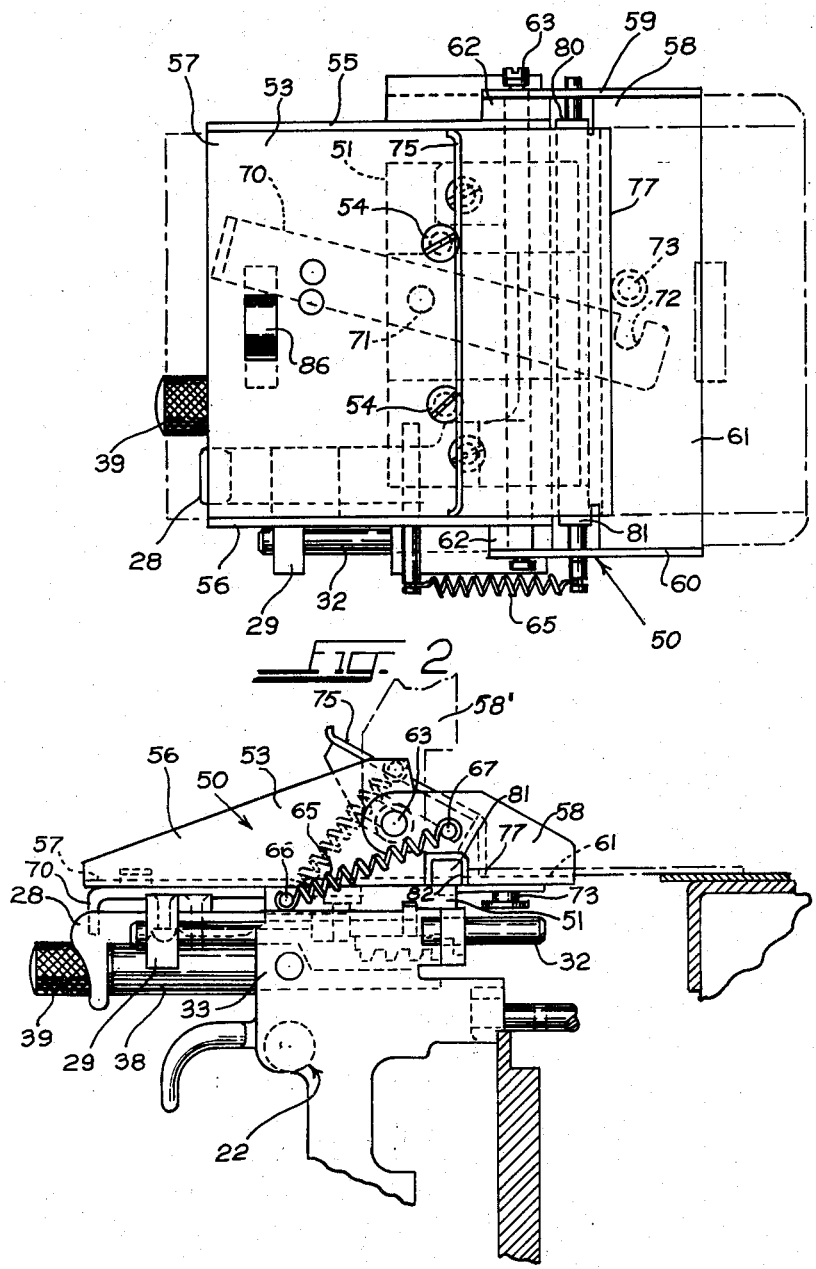
INVENTOR.
JOSEPH FREEDSON
BY
Wallace and Cannon
Att'ys.

July 12, 1960      J. FREEDSON      2,944,649
PRINTING DEVICE WORK HOLDER
Filed Aug. 16, 1956      3 Sheets-Sheet 3
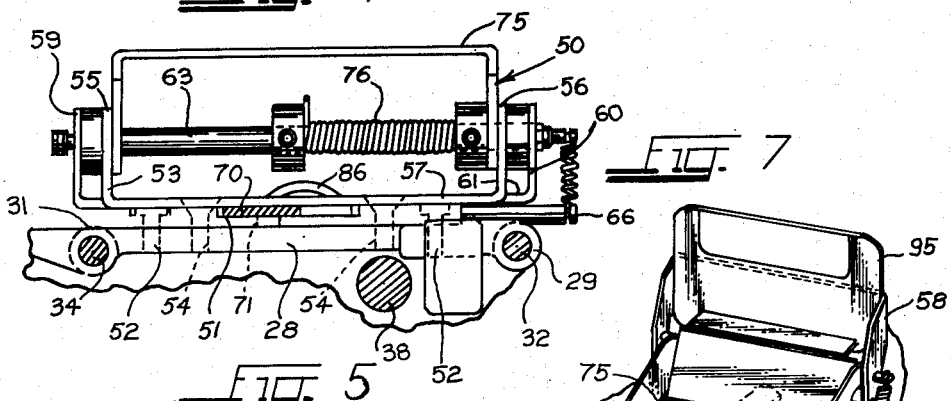
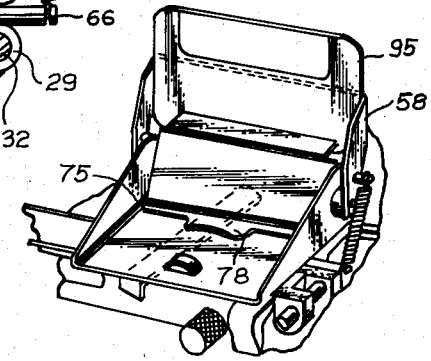
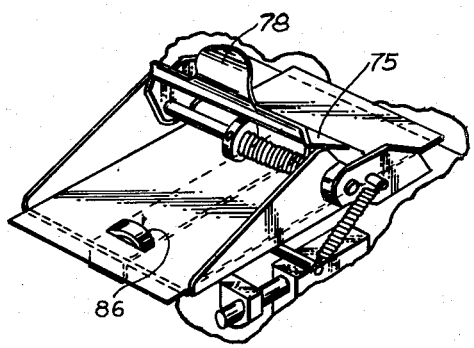
INVENTOR.
JOSEPH FREEDSON
BY
Wallace and Cannon
Atty's.

United States Patent Office 2,944,649
Patented July 12, 1960

2,944,649

PRINTING DEVICE WORK HOLDER

Joseph Freedson, Cleveland Heights, Ohio, assignor to Addressograph-Multigraph Corporation, Cleveland, Ohio, a corporation of Delaware Filed Aug. 16, 1956, Ser. No. 604,379

10 Claims. (Cl. 197—6.6)

This invention relates to embossing machines and more particularly to workholders for locating and supporting plastic cards or the like of varying dimensions in operative position in such machines.

Individual printing devices bearing the name, address, and other pertinent information identifying an individual person and/or a particular account have come into increasingly widespread use in connection with an ever-broadening variety of business applications. One of the most common of these applications is in the field of credit selling, in which a business establishment or a group of business houses issues individual printing devices to customers who have been accorded credit privileges. Each time the customer makes a purchase on credit, he presents the credit card-printing device to the person making the sale, who then uses the device in a printing machine to imprint a sales slip, contract, or other business memorandum with the pertinent information carried by the device and thereby identify the customer involved in the transaction. Many such credit-verification systems employ metal printing devices as the requisite identification means, but others are based upon the use of small plastic cards embossed with type characters to form a printing device bearing the necessary identifying information.

Different business establishments have indicated preferences for individual printing devices which vary substantially with respect to each other in size and configuration, despite the fact that the ultimate use of the devices is essentially the same. This is highly understandable in view of usual commercial practices and the fact that it is desirable to distinguish a business establishment to the fullest extent possible from all competitors and even from non-competing but somewhat similar businesses. In many instances, however, it is not economically practicable for an individual store or other business house to purchase an embossing machine for its own use in preparing the individual credit or other identification devices, particularly where the number of devices expected to be issued in any given period is relatively small. Consequently, it is highly desirable to provide a means for embossing plastic cards or the like of varying dimensions in a single embossing machine in order that the manufacturer and/or supplier of the blank or unembossed printing devices can maintain an economical embossing service for several different businesses.

In accordance with at least one proposal, moreover, a single recording system for business transactions may utilize printing devices having different shapes to identify different and equally important elements of each individual transaction. A record system of this type may, for example, utilize a first series of printing devices, usually similar to conventional credit charge plates, to identify individual participants in the system such as the persons authorized to borrow books from a library. A second series of printing devices, substantially different in size and configuration from the first series, may be employed to identify goods, services, or the like such as the individual books from the library. In a system of this type, it is highly desirable that means be provided for embossing both types of printing plate in a single machine in order to minimize the cost of the capital equipment required. A recording system of this type and a preferred construction for the customer-identification printing devices are described and claimed in the co-pending application of Donald L. Erickson, Serial No. 615,170, filed October 10, 1956. In addition, and particularly in those applications where reduction of initial investment is of primary importance, it is highly desirable to provide for embossing of the printing devices in an embossing machine which requires a minimum of modification from presently available commercial equipment in order to avoid expensive engineering and development costs incident to production of a substantially new embossing machine.

A principal object of the invention, therefore, is the provision of a new and improved work holder for an embossing machine which is capable of supporting and locating printing devices of substantially different dimensions in the machine.

Another object of the invention is a work holder, adapted for locating and supporting any one of a plurality of differently-shaped cards or the like in operating position in an embossing machine, which affords convenient and readily accesible means for mounting the individual cards therein.

It is a specific object of the invention to provide a new and improved printing device work holder for an embossing machine which inherently positions the printing device in accurate alignment with respect to the embossing apparatus of the machine.

It is a corollary object of the invention to provide a new and improved work holder for locating and supporting any one of a plurality of plastic cards of varying dimensions in an embossing machine, which work holder is simple and economical in construction and inexpensive to manufacture.

Accordingly, the invention is directed to a work holder for locating and supporting any one of a plurality of blank printing devices, usually plastic cards or the like, having substantially different dimensions in predetermined embossing position upon the carriage of an embossing machine. A work holder constructed in accordance with the invention comprises a first guide member adapted to be mounted in fixed position upon the embossing machine carriage; this first guide member includes a first guideway comprising a substantially planar card-supporting surface which extends transversely of the carriage. A second guide member is pivotally mounted upon the first guide member for movement between a first operating position and a second operating position. This second guide member includes a second guideway having a card-supporting surface which extends from the first card-supporting surface in substantially co-planar relationship with respect thereto when the second guide member is in its first operating position and which extends upwardly at a substantial angle with respect to the first guideway surface when the second guide member is in the other of its operating positions. A retaining member is pivotally mounted upon the first guide member and biasing means are provided for resiliently urging the retaining member toward the second guideway surface in order to retain a plastic card in contact with that surface. In addition, further biasing means are connected to the second guide member for resiliently resisting movement of that guide member from its first operating position to its second operating position.

Other and further objects of the present invention will be apparent from the following description and claims and are illustrated in the accompanying drawings which, by way of illustration, show a preferred embodiment of the invention and the principles thereof and what I now consider to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a fragmental perspective view illustrating the front of an embossing machine in which the inventive work holder may be employed;

Fig. 2 is a plan view of a work holder constructed in accordance with one embodiment of the invention;

Fig. 3 is a side elevational view of the work holder of Fig. 2;

Fig. 4 is an end elevation view of the work holder of Fig. 3;

Fig. 5 is a plan view of one type of printing device which may be processed using the inventive work holder;

Fig. 6 is a plan view of a second printing device which may be processed using the work holder of the invention;

Fig. 7 is a perspective view showing the work holder of Fig. 2 mounted upon the carriage of the embossing machine of Fig. 1, a portion of the work holder being disposed in a first operating position; and Fig. 8 is a perspective view of the work holder similar to Fig. 5 but showing the work holder in a second operating position.

The embossing machine 10 illustrated in Fig. 1 is in most respects conventional in form and is substantially similar in construction and operation to the embossing machine shown in Patent No. 1,831,103 to Duncan and Hubbard, obtained November 10, 1931. The embossing machine includes a frame 11 which is employed to support the operating mechanism of the machine. A punch head 12 is mounted within embossing machine 10, being supported upon a vertical shaft (not shown in the drawings) for rotational movement and for vertical displacement along the shaft as described in the aforementioned patent to Duncan et al. A plurality of individual character punches 13 are disposed in vertically slidable positions at spaced points around the periphery of punch head 12 so that, when a particular one of the punches 13 is disposed in an operating position adjacent the front of machine 10, that punch may be operated downwardly through an embossing or indenting stroke to emboss the particular character in a plastic card or the like supported in the machine, as will be described more completely hereinafter. The character punches 13 are selected to afford all of the characters which may be necessary for identification legends, including at least all of the letters of the alphabet, the ten numerical symbols, and a minimum of punctuation symbols preferably including at least a comma punch and a period punch.

Embossing machine 10 further includes a lower embossing head 14 which is utilized to regulate the operating position of upper head 12 by means including a register ring 15 as described in the aforementioned Duncan et al. patent. In this respect, it should be noted that the mechanism utilized in the patent to actuate the forming elements of the lower head of the embossing machine is not necessarily included in embossing machine 10. The actuating mechanism for operating punches 13 is essentially similar to that described in the patent and includes an operating arm 16 which is pivotally mounted as indicated at 17 on the frame 11 of the embossing machine and which extends over the operating or embossing position of the machine. Means are provided on arm 16 to impart downward operating movement to the punch 13 positioned at the embossing location and subsequently to retract the punch to the elevated position shown in Fig. 1. The embossing machine further includes an interposer 18 which is employed to actuate operating arm 16 in the manner described in the Duncan et al. patent, after a selected one of the punches 13 has been stopped in the embossing position of the machine.

Embossing machine 10 further includes a support rail 19 which is supported upon frame 11 as indicated at locations 20 and 21 and which extends across the entire face of the embossing machine. A carriage generally indicated at 22 is supported upon rail 19 by means including a pair of upper rollers 23 and 24 and a pair of front rollers 25 and 26 which permit the carriage to move laterally with respect to the operating heads 12 and 14 of the embossing machine. In the illustrated apparatus, carriage 22 is continuously urged in a left-hand direction, as indicated in Fig. 1, by means including a spring biased tensioning band 27 of conventional form. Movement of the carriage may be controlled by an escapement mechanism, not shown, which operates near the end of each machine cycle in conventional manner.

The requisite line-spacing movements of the material being embossed by embossing machine 10 are attained by means including a cross slide 28 which is mounted upon carriage 22 for movement in a front to rear direction; that is, cross slide 28 moves transversely with respect to the direction of character-spacing movement of carriage 22. Cross slide 28 includes a pair of rigid lugs 29 and 30 which extends from the slide at one side thereof and an additional lug 31 which projects from the opposite side of the slide. Lugs 29 and 30 engage a first guide rod 32 mounted in a bearing member 33 which constitutes an integral part of carriage 22, whereas lug 31 engages a second guide rod 34 mounted in a second bearing member 35 on the opposite side of the carriage. Thus, the cross slide is supported for horizontal movement in a front to rear direction to enable a work piece carried on the slide to be line-spaced with respect to the operating position of the embossing machine. Controlled actuation of cross slide 28 is provided by an operating mechanism which may, for example, include a rock shaft 38 having the usual knurled head 39. A character-spacing indicator device, including a pointer 40 connected to carriage 22 and a character scale 41 mounted upon support rail 19, is also included in the embossing machine in accordance with conventional practice.

It will be recognized by those skilled in the art that embossing machine 10, as thus far described, is essentially conventional in construction and operation; accordingly, only a very brief description of the operation of the machine is included herein. The embossing machine is energized by suitable means, not shown, to set the operating heads in rotation. The material to be embossed is mounted in a work holder, to be described hereinafter, on carriage 22 and extended into the operating position of the machine between punch heads 12 and 14. An individual character punch is selected by the usual means, not shown, and interposer 18 and operating arm 16 are actuated to depress the punch and emboss the selected character in the material held by the work holder. This process is repeated for each character in a given line, after which rock shaft 38 is actuated by means of operating head 39 to advance the material being embossed into the machine through a distance equal to one line space. These operations are repeated to the extent necessary to emboss the entire desired legend in the material supported upon the work holder.

The present invention is directed to a particular work holder structure for use in the conventional embossing machine described immediately above in connection with Fig. 1 and/or in like indenting apparatus. The work holder 50, which is shown in detail in Figs. 2, 3 and 4, includes a mounting block 51 affixed to cross slides 28 by some suitable means such as the bolts 52. A first guide member 53 is rigidly mounted upon the guide block 51 as by a plurality of bolts 54; guide member 53 includes upturned sides 55 and 56 which define a first guide way having a planar card-supporting surface 57.

A second guide member 58 is pivotally mounted on the front end of guide member 53; that is, guide member 58 is mounted on the end of guide member 53 adjacent the embossing heads of the machine (see Fig. 3). Guide member 58 includes a pair of upturned sides 59 and 60 which define a second guideway having a substantially planar card-supporting surface 61; as indicated in the drawings, guideway surface 61 is substantially wider than guideway surface 57. Guide member 58 is spaced from guide member 53 by a pair of washers 62 which maintain the second guide member in alignment on its pivotal mounting shaft 63. In the position shown in Figs. 2, 3 and 4, which constitutes the embossing or first operating position of work holder 50, the guideway surface 61 of guide member 58 is substantially co-planar with the corresponding surface 57 of guide member 53.

Biasing means comprising a spring 65 is included in work holder 50; spring 65 is connected between a pin 66 mounted on the work holder mounting block 51 and a second pin 67 affixed to the second guide member 58. The biasing spring tends to retain guide member 58 in the position shown in Figs. 2, 3 and 4 whenever guide member 58 is established in that position. Guide member 58 may, however, be pivoted to an alternate or second operating position as indicated by dash outline 58' in Fig. 3. Consequently, biasing spring 65 functions as an over-center biasing device by virtue of the relative locations of pins 66 and 67 with respect to the pivotal mounting 63 of guide member 58 on member 53 and, when guide member 58 is in its second operating position, the spring tends to hold the guide member in that position. In addition, the work holder is provided with a guide member locking lever 70 which is pivotally mounted upon mounting block 51 as by a pin 71. As best seen in Fig. 2, locking lever 70 is provided with a latch recess 72 adapted to engage a latch pin 73 which extends from the lower surface of guide member 58. Accordingly, locking lever 70 may be utilized to latch guide member 58 in its first or embossing position as shown in Figs. 2–4.

Work holder 50 is also provided with a retaining member 75 which is pivotally mounted upon the same shaft 63 as is utilized to support guide member 58. A torsion biasing spring 76 is mounted upon shaft 63 and urges one end 77 of the retaining member toward contact with the card-supporting surface 61 of guide member 58.

Two guide lugs 80 and 81, which form an integral part of guide member 58, are provided at the opposite sides of the end of that guide member adjacent first guide member 53. As indicated in Fig. 3, one surface 82 of guide lug 81 faces card-supporting surface 61 of second guide member 58. In addition, another guide lug 86 is provided in guide member 53; lug 86 comprises a relatively small lug punched from the base of the guide member and extending above card-supporting surface 57 in the central portion thereof.

In order fully to understand the operation of work holder 50, it is desirable to consider first at least two of the different configurations of printing devices which the work holder may be required to position in embossing machine 10. One such device is shown in Fig. 5 and comprises a sheet 90 of plastic material or the like having a pair of guide apertures 91 and 92 located at spaced points adjacent the opposite ends thereof. Fig. 5 also shows the legend 93 which is to be embossed at one end of printing device 90 and an alternative location 94 for the embossed information. Printing device 90 may, for example, comprise an identification device for books, other goods, services, or the like; its function in a recording system is described in detail in the aforementioned co-pending Erickson application.

Fig. 6 shows another printing device 95 which is suitable for use as an individual customer-identification means in a conventional credit-verification system or in the recording system of the Erickson invention. Device 95 comprises a thin, flat plastic plate which is to be embossed in a restricted area 96 with identification information as indicated at 97. As noted hereinabove, a preferred laminar construction for this particular printing device is described in the Erickson application, and the device may carry on advertising or other message in printed form in addition to the embossed legend 97. As indicated in the drawing, printing device 95 has a width W95 which is substantially greater than the width W90 of printing device 90. On the other hand, the height H95 of printing device 95 is very much smaller than the height H90 of the first printing device. Thus, the two illustrated printing devices are illustrative of the wide variations in dimensions and configurations of the printing devices which may be supported in work holder 50.

When it is desired to emboss a printing device such as device 95, guide member 58 of the work holder is first moved to its alternate or second operating position as shown in Fig. 7. The handle or operating tab portion 78 of retaining members 75 is then depressed and a blank printing device 95 is inserted in guide member 58 in the position shown, after which retaining member 75 is released and is brought to bear against the plastic card by the biasing action of spring 76 (see Figs. 3 and 4). The position of the printing device blank in guide member 58 is determined by pushing it into the guide member until it engages the surface 82 of guide lug 81. Consequently, each of the printing device blanks may be inserted with consistency and accuracy into the work holder. Subsequently, guide member 58 is moved to its first operating or embossing position as shown in Figs. 2–4 and is latched in that position by means of latching lever 70. The printing device blank is then embossed with the desired legend in embossing machine 10 in accordance with conventional practice, although it should be noted that in the case of a plastic card the usual heating of the printing device during embossing may be eliminated.

After the identification printing plate has been completely embossed with a suitable legend 97, latching lever 70 is released and guide member 58 is again moved to its second operating position as shown in Fig. 7. This permits easy access to the completed printing device and accordingly facilitates its removal from the embossing machine work holder 50. Another printing device blank may then be inserted in the work holder and embossed in accordance with the procedure set forth above.

The operating procedure for the substantially longer and somewhat narrower printing device 90 is somewhat different. Because this particular shape of printing device affords a substantially greater height than device 95, device 90 may be handled entirely from the side of the work holder opposite the embossing heads of the machine; consequently, guide member 58 may be latched in its first or embossing operating position by means of lever 70 throughout the indenting procedure. In this instance, the tongue or handle 78 of retaining member 75 is depressed and a blank printing device 90 is inserted into the work holder 50 from the rear, being brought into engagement with guide lug 86 in order accurately to determine its transverse position with respect to the embossing heads of machine 10. Retaining element 75 is then released and clamps the printing device blank firmly into the work holder. As before, the desired legend 93 is embossed into the printing device blank, after which the blank is removed from the work holder. The same process may then be repeated with another blank printing device. In the case of printing device 90, the two lug-engaging apertures 91 and 92 are so spaced in the printing device blank that the legend may be embossed at either of locations 93 or 94 and, if the original legend becomes meaningless through abandonment of the goods or the like identified thereby, the printing device may be re-embossed at the alternate location to permit re-use thereof.

Thus, work holder 50 greatly increases the versatility of embossing machine 10 with respect to variations in dimensions and configurations of the printing devices or other similar devices which may be processed therein. It permits the machine to handle interchangeably the relatively wide, short blanks 95 and the narrower but much longer devices 90 without requiring any change in the machine and without necessitating replacement of the work holder. It is particularly valuable in the processing of plastic printing devices of varying dimensions, especially in those systems which require the use of two or more differently shaped identification devices. Mounting and de-mounting of either general type of printing instrument is convenient and simple, and the work holder inherently provides for accurate positioning of both types of printing device blank.

Hence, while I have illustrated and described a preferred embodiment of my invention, it is to be understood that it is capable of variation and modification, and I therefore do not wish to be limited to the precise details set forth, but desire to avail myself of such changes and alterations as fall within the purview of the following claims.

I claim:

1. A work holder for locating and supporting any one of a plurality of blank printing devices or the like having substantially different dimensions in predetermined embossing positions upon the carriage of an embossing machine, said work holder comprising: a first guide member adapted to be mounted in fixed position upon said machine carriage and having a first guideway comprising a substantially planar blank-supporting surface extending transversely of said carriage; a second guide member pivotally mounted upon said first guide member and movable between first and second operating positions, said second guide member having a second guideway comprising a blank-supporting surface which extends from said first blank-supporting surface in substantially co-planar relationship with respect to said first guideway surface when said second guide member is in one of said operating positions and which extends upwardly at a substantial angle with respect to said first guideway surface when said second guide member is in the other of said operating positions; a retaining member pivotally mounted upon said first guide member; biasing means resiliently urging said retaining member toward contact with said second guideway surface to retain a printing device blank in contact with said second guideway surface; and biasing means connected to said second guide member for resiliently resisting movement of said second guide member from its first operating position to its second operating position.

2. A work holder for locating and supporting any one of a plurality of blank printing devices such as plastic cards or the like having substantially different dimensions in predetermined embossing position upon the carriage of an embossing machine, said work holder comprising: a first guide member adapted to be mounted in fixed position upon said machine carriage and having a first guideway comprising a substantially planar card-supporting surface extending transversely of said carriage; a second guide member pivotally mounted upon said first guide member and movable between first and second operating positions, said second guide member having a second guideway comprising a card-supporting surface which extends from said first card-supporting surface in substantially co-planar relationship with respect to said first guideway surface when said second guide member is in its first operating positions and which extends upwardly at a substantial angle with respect to said first guideway surface when said second guide member is in the other of said operating positions; a retaining member pivotally mounted upon said first guide member; biasing means resiliently urging said retaining member toward contact with said second guideway surface to retain a plastic card in contact with said second guideway surface; and over-center biasing means connected to said second guide member for resiliently resisting movement of said second guide member from either of its two operating positions to the other of said two positions.

3. A work holder for locating and supporting any one of a plurality of blank printing devices such as plastic cards or the like having substantially different dimensions in predetermined embossing position upon the carriage of an embossing machine, said work holder comprising: a first guide member adapted to be mounted in fixed position upon said machine carriage and having a first guideway comprising a substantially planar card-supporting surface of predetermined width extending transversely of said carriage; a second guide member pivotally mounted upon said first guide member and movable between first and second operating positions, said second guide member having a second guideway comprising a card-supporting surface which extends from said first card-supporting surface in substantially co-planar relationship with respect to said first guideway surface when said second guide member is in one of said operating positions and which extends upwardly at a substantial angle with respect to said first guideway surface when said second guide member is in the other of said operating positions, said second guideway surface having a width substantially greater than said first guideway surface; a retaining member pivotally mounted upon said first guide member; biasing means resiliently urging said retaining member toward contact with said second guideway surface to retain a plastic card in substantially continuous contact with said second guideway surface; and over-center biasing means connected to said second guide member for resiliently resisting movement of said second guide member from either of its two operating positions to the other of said two positions.

4. A work holder for locating and supporting any one of a plurality of blank printing devices such as plastic cards or the like having substantially different dimensions in predetermined embossing position upon the carriage of an embossing machine, said work holder comprising: a first guide member adapted to be mounted in fixed position upon said machine carriage and having a first guideway comprising a substantially planar card-supporting surface extending transversely of said carriage; a second guide member pivotally mounted upon said first guide member and movable between first and second operating positions, said second guide member having a second guideway comprising a card-supporting surface which extends from said first card-supporting surface in substantially co-planar relationship with respect to said first guideway surface when said second guide member is in one of said operating positions and which extends upwardly at a substantial angle with respect to said first guideway surface when said second guide member is in the other of said operating positions; a retaining member mounted upon said first guide member for pivotal movement about a horizontal axis coincident with the axis of pivotal movement of said second guide member; biasing means resiliently urging said retaining member toward contact with said second guideway surface to retain a plastic card in contact with said second guideway surface; and over-center biasing means connected to said second guide member for resiliently resisting movement of said second guide member from either of its two operating positions to the other of said two positions.

5. A work holder for locating and supporting any one of a plurality of blank printing devices such as plastic cards or the like having substantially different dimensions in predetermined embossing position upon the carriage of an embossing machine, said work holder comprising: a first guide member adapted to be mounted in fixed position upon said machine carriage and having a first guideway comprising a substantially planar card-supporting surface extending transversely of said carriage; a second guide member pivotally mounted upon said first guide member and movable between first and second operating positions, said second guide member having a second guideway comprising a card-supporting surface which extends from one end of said first card-supporting surface in substantially co-planar relationship with respect to said first guideway surface when said second guide member is in one of said operating positions and which extends upwardly at a substantial angle with respect to said first guideway surface when said second guide member is in the other of said operating positions; a guide lug, extending above said card-supporting surface of said first guideway at the end thereof opposite said second guideway for engaging a plastic card and determining the location thereof in said first guideway; a retaining member mounted upon said first guide member for pivotal movement with respect thereto; biasing means resiliently urging said retaining member toward contact with said second guideway surface to retain a plastic card in contact with said second guideway surface; and biasing means connected to said second guide member for resiliently resisting movement of said second guide member from its first operating position to its second position.

6. A work holder for locating and supporting any one of a plurality of plastic cards or the like having substantially different dimensions in predetermined embossing positions upon the carriage of an embossing machine, said workholder comprising: a mounting block adapted to be affixed to said carriage; a first guide member mounted in fixed position upon said mounting block and having a first guideway comprising a substantially planar card-supporting surface extending transversely of said carriage; a second guide member pivotally mounted upon said first guide member and movable between first and second operating positions, said second guide member having a second guideway comprising a card-supporting surface which extends from said first card-supporting surface in substantially co-planar relationship with respect to said first guideway surface when said second guide member is in one of said operating positions and which extends upwardly at a substantial angle with respect to said first guideway surface when said second guide member is in the other of said operating positions; a retaining member pivotally mounted upon said first guide member; biasing means resiliently urging said retaining member toward contact with said second guideway surface to retain a plastic card in contact with said second guideway surface; and over-center biasing means comprising a spring connected between said second guide member and said mounting block for resiliently resisting movement of said second guide member from either of its operating positions to the other of its operating positions.

7. A work holder for locating and supporting any one of a plurality of blank printing devices or the like having substantially different dimensions in predetermined embossing positions upon the carriage of an embossing machine, said work holder comprising: a first guide member adapted to be mounted in fixed position upon said machine carriage and having a first guideway of predetermined width affording a blank-supporting surface extending transversely of said carriage; a second guide member having a second guideway substantially wider than said first guideway and affording a blank-supporting surface adapted to extend from said first card-supporting surface in substantially co-planar relationship with respect to said first guideway surface; a retaining member pivotally mounted upon said first guide member for movement between a clamping position closely adjacent said second guideway surface and an inactive position spaced from said second guideway surface; and resilient biasing means for maintaining said retaining member in said clamping position.

8. A work holder for locating and supporting any one of a plurality of blank printing devices or the like having substantially different dimensions in predetermined embossing positions upon the carriage of an embossing machine, said work holder comprising: a first guide member adapted to be mounted in fixed position upon said machine carriage and having a first guideway of predetermined width affording a blank-supporting surface extending transversely of said carriage; a second guide member having a second guideway substantially wider than said first guideway and affording a blank-supporting surface adapted to extend from said first card-supporting surface in substantially co-planar relationship with respect to said first guideway surface; at least one guide lug, extending above the blank-supporting surface of said first guideway, for engaging a printing device blank to determine the location thereof in said first guideway; a retaining member pivotally mounted upon said first guide member for movement between a clamping position closely adjacent said second guideway surface and an inactive position spaced from said second guideway surface; and resilient biasing means for maintaining said retaining member in said clamping position.

9. A work holder for locating and supporting any one of a plurality of blank printing devices or the like having substantially different dimensions in predetermined embossing positions upon the carriage of an embossing machine, said work holder comprising: a first guide member adapted to be mounted in fixed position upon said machine carriage and having a first guideway comprising a blank-supporting surface extending transversely of said carriage; a second guide member mounted upon said first guide member and movable between first and second operating positions, said second guide member having a second guideway comprising a blank-supporting surface which comprises an extension of said first blank-supporting surface and is in alignment therewith when said second guide member is in one of said operating positions and which is displaced from said first guideway surface when said second guide member is in the other of said operating positions; a retaining member mounted upon one of said guide members; and biasing means resiliently urging said retaining member toward contact with said second guideway surface to retain a printing device blank in contact with said second guideway surface.

10. A work holder for locating and supporting any one of a plurality of blank printing devices or the like having substantially different dimensions in predetermined embossing positions upon the carriage of an embossing machine, said work holder comprising: a first guide member adapted to be mounted in fixed position upon said machine carriage and having a first guideway comprising a substantially planar blank-supporting surface extending transversely of said carriage; a second guide member mounted upon said first guide member and movable between first and second operating positions, said second guide member having a second guideway comprising a blank-supporting surface which extends from said first blank-supporting surface in substantially co-planar relationship with respect to said first guideway surface when said second guide member is in one of said operating positions and which is displaced from said first guideway surface when said second guide member is in the other of said operating positions; a retaining member mounted upon said first guide member; biasing means resiliently urging said retaining member toward contact with said second guideway surface to retain a printing device blank in contact with said second guideway surface; and biasing means connected to said second guide member for resiliently resisting movement of said second guide member from its first operating position to its second operating position.

References Cited in the file of this patent
UNITED STATES PATENTS
2,391,777   Gollwitzer ------------ Dec. 25, 1945